United States Patent [19]

Misura

[11] 4,398,008
[45] Aug. 9, 1983

[54] THICK POLYOL (ALLYL CARBONATE) POLYMERIZATES AND METHOD OF PREPARING SAME

[75] Inventor: Michael S. Misura, Barberton, Ohio

[73] Assignee: PPG Industries, Inc., Pittsburgh, Pa.

[21] Appl. No.: 327,871

[22] Filed: Dec. 7, 1981

[51] Int. Cl.$^3$ .......................................... C08F 118/00
[52] U.S. Cl. .................................................. 526/314
[58] Field of Search ........................................ 526/314

[56] References Cited

U.S. PATENT DOCUMENTS

| 2,568,658 | 9/1951 | Pope | 526/314 |
| 3,751,374 | 8/1973 | Berry | 526/314 |
| 4,205,154 | 5/1980 | Stevens | 526/314 |
| 4,260,564 | 4/1981 | Baiocchi | 526/314 |
| 4,310,642 | 1/1982 | Margotte | 526/314 |

Primary Examiner—Paul R. Michl
Attorney, Agent, or Firm—Richard M. Goldman

[57] ABSTRACT

Disclosed is a method of preparing a thick casting of polyol (allyl carbonate) by preparing a monolithic, partially cured, first polymerizate of polyol (allyl carbonate), forming a pool of polyol (allyl carbonate) monomer in contact with the monolithic, partially cured, first polymerizate, and thereafter forming a thick, single phase polyol (allyl carbonate) polymer. Also disclosed is the polymer prepared therefrom.

7 Claims, 1 Drawing Figure

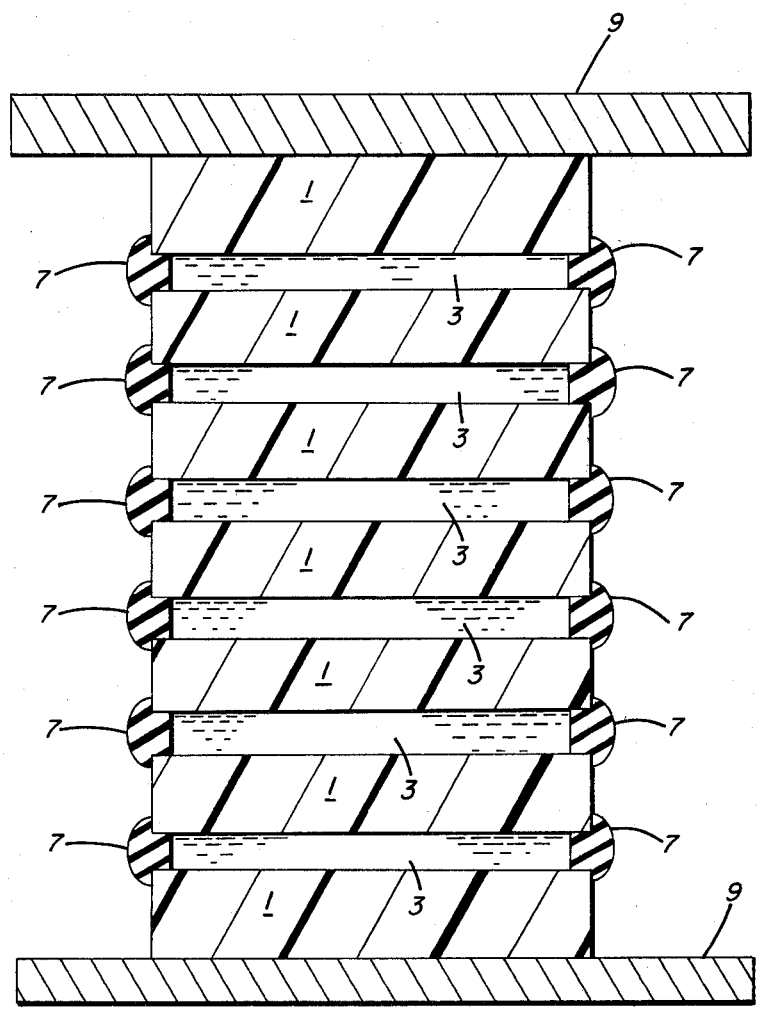

THICK POLYOL (ALLYL CARBONATE) POLYMERIZATES AND METHOD OF PREPARING SAME

DESCRIPTION OF THE INVENTION

Polyol (allyl carbonates) are characterized by optical clarity, transparency, abrasion resistance, and high refractive indices. However, the polymerization of polyol (allyl carbonates) is exothermic, and the monomer, the polymerizing system, and the polymer all have low coefficients of thermal conductivity. This limits the thicknesses of polyol (allyl carbonates) polymers. Thick polymerization systems heat up rapidly, accelerating polymerization reaction rate, thereby discoloring the resulting polymer and forming haze therein.

U.S. Pat. No. 2,568,658 to Pope for METHOD OF POLYMERIZING POLYUNSATURATED ESTERS discloses the formation of thick polymerizates of diol bis(allyl carbonates) by suspending particles of fully cured diol bis(allyl carbonate) in diol bis(allyl carbonate) monomer, and curing the monomer to form a heterogeneous polymerizate.

It has now been found that a desirable, thick, homogeneous polymerizate, characterized by the substantial absence of haze and discoloration, may be prepared by partial polymerization of one or more monolithic polymerizates, thereafter providing a pool of monomer in contact therewith, and polymerizing the partially cured polymerizate and the monomer to form a single monolithic polymerizate, i.e., a single polymerizate constituting one undifferentiated whole exhibiting solid uniformity, without diversity or variability.

THE FIGURE

The FIGURE is a cut-away view of partially cured polyol (allyl carbonate) sheets in contact with pools of polyol (allyl carbonate) monomer to form a single monolithic polyol (allyl carbonate) casting.

DETAILED DESCRIPTION OF THE INVENTION

It has now been found that a thick, colorless, haze free, polymerizate of polyol (allyl carbonate) may be prepared by sequential casting. That is, by partially curing sheets of polymer, providing thick pools of monomer between the partially cured sheets and curing the resulting combination of monomer pools and partially cured sheets.

An assembly for carrying out the method of this invention is shown in the FIGURE. As there shown, individual sheets 1 of partially cured polymerizate are maintained in spaced apart relationship. Pools 3 of monomer are provided between the individual sheets 1 of partially cured polymerizate, with a pool 3 of monomer between each pair of sheets 2. The sheets 1 are spaced apart by compressible gaskets 7, and the assembly is held in compression between rigid molds, e.g., metal or glass plates 9 by compressive means, not shown, during cure.

By a thick polymerizate is meant a polymerizate sufficiently thick that the rate of heat generation associated with the exothermic heat of reaction of the polymerization is greater than the rate of heat transfer out of the polymerizing composition. As herein contemplated, the polymer is of sufficiently great thickness, where the thickness is the smallest linear dimension of the polymerizing composition, that a single step polymerization would result in a polymerizate characterized by excessive discoloration or haze or both.

By a polymerizate free of discoloration is meant a polymerizate having substantially uniform transmittance of light of a given wavelength anisotropically and independently of location within the polymerizate.

By a haze-free polymerizate is meant a polymerizate substantially free of visually observable bubbles, inclusions, imperfections, or dispersions.

According to the method herein contemplated, a partially cured first polymerizate of polyol (allyl carbonate) is prepared. The polymerizate is thin enough to avoid discoloration or haze formation during polymerization. The polymer is cured to provide rigidity. That is, the monomer composition is cured to provide a polymer that retains its shape when removed from a polymerization mold, that supports its own weight, that has a measurable Izod Notched impact strength, and that has a fifteen second Barcol hardness less than 20.

The desired degree of cure may be provided by curing a composition of diol bis(allyl carbonate) containing from 0.04 mole percent to 0.15 mole percent diisopropyl peroxy dicarbonate basis diol bis(allyl carbonate) from an initial temperature of 40 degrees Centigrade to a final temperature of from 70 degrees Centigrade over a period of 20 hours to about 80 degrees Centigrade over a period of 24 hours. Equivalently, the desired degree of cure may be provided by curing a composition of diol bis(allyl carbonate) containing from 0.04 mole percent benzoyl peroxide to 0.15 mole percent benzoyl peroxide from an initial temperature of about 60 degrees Centigrade to a final temperature of from about 85 degrees Centigrade over 12 hours to about 92 degrees Centigrade over a period of about 16 hours.

The resulting partially cured, monolithic, first polymerizate is transparent, water white, and substantially free of haze, and has a thickness of up to about 0.5 inch (12 millimeters) in its shortest dimension.

Thereafter the rigid, partially cured polymerizate serves a one surface of a polymerization mold for a liquid pool of polyol (allyl carbonate). Alternatively, two rigid, partially cured polymerizates may be utilized as polymerization molds, with polyol (allyl carbonate) monomer introduced therebetween. The spacing between molds, that is, the spacing between the monolithic first polymerizate and, e.g., a glass mold, or between the monolithic, first polymerizate and a second monolithic casting of partially cured first polymerizate is up to about 0.5 inch (12 millimeters), whereby to avoid discoloration, haze formation, and the like, as described above.

The assembly, i.e., of glass mold, monomer, and partially cured polymer, or of castings of partially cured monomer, with a pool of monomer of up to about 0.5 inch thick therebetween, is thereafter heated to effect polymerization to substantially complete cure. That is, the assembly is heated, for example, according to the schedule shown in Table I for diisopropyl peroxy dicarbonate or the schedule shown in Table II for benzoyl peroxide.

TABLE I

| Time Temperature Sequence For Diisopropyl Peroxydicarbonate Cure | |
|---|---|
| Cumulative Time (hours) | Temperature, °C. |
| 0 | 42 |
| 4 | 44 |
| 6 | 45 |

TABLE I-continued
Time Temperature Sequence For Diisopropyl Peroxydicarbonate Cure

| Cumulative Time (hours) | Temperature, °C. |
|---|---|
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 23.6 | 84 |
| 24 | 98 |
| 24.1 | 100 |

TABLE II
Time-Temperature Sequence For Benzoyl Peroxide Cure

| Cumulative Hours | Temperature, °C. |
|---|---|
| 2 | 63 |
| 4 | 65 |
| 6 | 67 |
| 8 | 77 |
| 10 | 80 |
| 12 | 85 |
| 14 | 88 |
| 16 | 92 |
| 18 | 100 |

The resulting thick polymerizate, having a thickness generally greater than about 1 inch (24 millimeters) is a single phase material. By a single phase material is meant a homogeneous material where phase boundaries and separate phases are not visible to the naked eye, and where the resulting thick casting has a uniform index of refraction therethrough. The thick casting is further characterized by the substantial absence of haze and discoloration.

The thick polymerizates herein contemplated find utility as aircraft and armored vehicle transparencies or elements thereof, as windows for laboratory hoods and hot boxes, and as optical elements, e.g., thick lens elements and prisms.

Polyol (allyl carbonates) which may be polymerized by the method herein described include mono-functional allyl carbonates, diol bis(allyl carbonates), triol tris(allyl carbonates), tetra kis(allyl carbonates), and higher polyol (allyl carbonates).

Diol bis(allyl carbonate) monomers which may be polymerized by the method of this invention are normally linear, aliphatic liquid allyl carbonates, i.e., glycol bis(allyl carbonate) compounds, in which the allyl groups may be substituted at the 2 position with a halogen, notably chlorine or bromine, or a 1 to 4 carbon alkyl group, generally a methyl or ethyl group, and the glycol group may be an alkylene, alkylene ether, alkylene polyether or alkylene carbonate group having from 2 to 10 carbons and oxygens. These diol bis(allyl carbonate) monomers are represented by the formula:

$$R_1-O-\overset{O}{\underset{\|}{C}}-O-R_2-O-\overset{O}{\underset{\|}{C}}-O-R_3$$

where $R_1$ and $R_3$ are allyl or substituted allyl groups, and $R_2$ is as defined below. $R_1$ and $R_3$ are independently represented by the formula:

$$H_2C=\underset{\underset{R^1}{|}}{C}-CH_2-$$

where $R^1$ may be hydrogen, halogen, or a 1 to 4 carbon alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly, $R_1$ and $R_3$ are allyl groups, $H_2C=CH-CH_2-$. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as $-CH_2-O-CH_2-$, $-CH_2CH_2-O-CH_2CH_2-$, $-CH_2-O-CH_2-CH_2-$, and $-CH_2CH_2-O-CH_2CH_2CH_2-$, alkylene polyether groups such as $-CH_2CH_2-O-CH_2CH_2-O-CH_2CH_2-O-CH_2CH_2O-CH_2CH_2-$, and $-CH_2-O-CH_2-$ groups, and alkylene carbonate and alkylene polycarbonate groups such as $CH_2CH_2-O-CO-O-CH_2CH_2$ and $-CH_2CH_2-O-CH_2CH_2-O-CO-O-CH_2CH_2-OCH_2CH_2-$ groups. Most commonly, $R_2$ is $-CH_2CH_2-$, $-CH_2CH_2-O-CH_2CH_2-$, or $-CH_2CH_2-O-CH_2CH_2-O-CH_2CH_2$.

Specific examples of diol bis (allyl carbonate) monomers useful in carrying out the method herein contemplated include ethylene glycol bis (2-chloroallyl carbonate), diethylene glycol bis (2-methallyl carbonate), triethylene glycol bis (allyl carbonate), propylene glycol bis (2-ethylallyl carbonate), 1,3-propanediol bis (allyl carbonate), 1,3-butanediol bis (allyl carbonate), 1,4-butanediol bis (2-bromoallyl carbonate), dipropylene glycol bis (allyl carbonate), trimethylene glycol bis (2-ethylallyl carbonate), and pentamethylene glycol bis (allyl carbonate).

Commercially important diol bis (allyl carbonate) monomers which may be polymerized by the method herein contemplated are:

$$CH_2=CH-CH_2-O-\overset{O}{\underset{\|}{C}}-O-CH_2-CH_2-O-CH_2CH_2-O-CH_2CH_2-O-\overset{O}{\underset{\|}{C}}-O-CH_2CH=CH_2,$$

$$CH_2=CH-CH_2-O-\overset{O}{\underset{\|}{C}}-O-CH_2CH_2-O-CH_2CH_2-O-\overset{O}{\underset{\|}{C}}-OCH_2-CH=CH_2, \text{ and}$$

$$CH_2=CH-CH_2-O-\overset{O}{\underset{\|}{C}}-O-CH_2CH_2-O-\overset{O}{\underset{\|}{C}}-O-CH_2-CH=CH_2.$$

Triol tris(allyl carbonates) which may be polymerized by the method of this invention, either homopolymerized or copolymerized, e.g., with diol bis(allyl carbonates) are represented by the formula

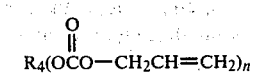

where $R_4$ is an organic moiety chosen from the group consisting of moieties derived from polyols and extended polyols, most frequently a triol or extended triol where the hydroxyl groups of the precursor polyol $R_4(OH)_n$ are non-vicinal.

While the functionality is tris functionality, it is to be understood that in higher polyols n is greater than 2, e.g., above about 2.2, representing a mixture of diols and higher polyols, to about 8 representing a derivative of trimeric pentaerythritol. By "non-vicinal" it is meant that the hydroxyl groups are not on adjacent carbons. Specific triol precursors useful in preparing the tris(allyl carbonate) materials useful in this invention are triols with primary or secondary hydroxyl groups. Triols having primary hydroxyl groups are preferred precursors. One such class of triols are 1,1,1-trimethylol alkanes. Also useful are extended trimethylol alkale tris-(allyl carbonate) monomers such as lactone extended trimethylol alkanes and alkyl oxide extended trimethylol alkanes. By an extended triol is meant the reaction product having terminal hydroxyl groups of the triol and a suitable reactant, e.g., an alkyl oxide or a lactone. Typical lactone extended trimethylol alkanes include ε-caprolactone extended trimethylol methane, ε-caprolactone extended trimethylol ethane, ε-caprolactone extended trimethylol propane, and ε-caprolactone extended trimethylol butane. Typical alkyl oxide extended triols include ethylene oxide extended trimethylol methane, ethylene oxide extended trimethylol ethane, ethylene oxide extended trimethylol propane, ethylene oxide extended trimethylol butane, propylene oxide extended trimethylol methane, propylene oxide extended trimethylol methane, propylene oxide extended trimethylol ethane, propylene oxide extended trimethylol butane.

The preferred polyols meeting these requirements have the general formula $R_4(OH)_n$ where n is greater than 2 up to about 8 and generally is about 3. $R_4$ can be

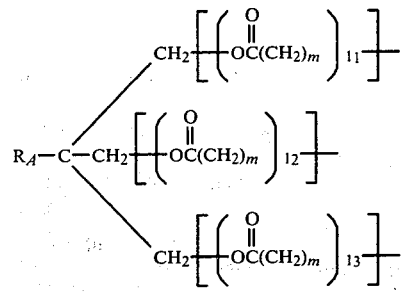

where $R_A$ is H, —$CH_3$, —$CH_2CH_3$, —$CH_2CH_2CH_3$, or —$CH_2CH_2CH_3$, and $l_1$, $l_2$ and $l_3$ are each integers from 0 to 5 and the sum of $l_1+l_2+l_3$ is 2 or more and generally from 2 to 8, although values as high as 15 are possible. The value of m depends on the lactone utilized to extend the polyol and is generally 4 or 5.

The chain extending lactone may be a delta lactone having the formula

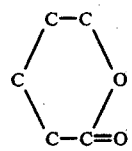

which can be substituted with hydrogen, methyl groups, or ethyl groups.

According to a still further exemplification, the chain extending lactone group can be an epsilon lactone having the formula:

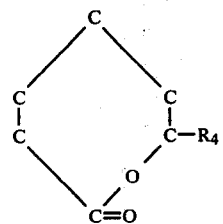

where $R_4$ is hydrogen, a methyl group, or an ethyl group and where $R_2$ can be on any of the carbons other than the carbonyl carbon. One exemplary triol is Union Carbide Corporation NIAX® PCP-0301 brand epsilon-caprolactone extended trimethylol propane.

According to a still further exemplification, $R_4$ can be

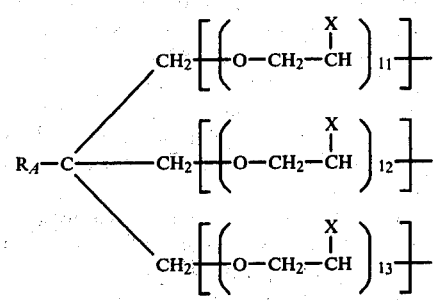

where $R_A$ is as defined previously, $l_1$, $l_2$ and $l_3$ are integers from 0 to 5 and the sum of $l_1+l_2+l_3$ is 2 or more and generally from about 2 to 8, although values as high as about 15 are possible, and X is H or $CH_3$. The chain extenders may be ethylene oxide groups as exemplified by Upjon ISONOL® 93 ethylene oxide extended trimethylol propane. Alternatively, the extenders may be propylene oxide groups as in BASF-Wyandotte PLURACOL TP brand propoxylated trimethylol propane.

According to a still further exemplification, $R_4(OH)_3$ may be an extended glycerol, for example, ethylene oxide extended glycerol having the general formula:

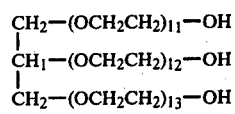

or propylene oxide extended glycerol having the formula:

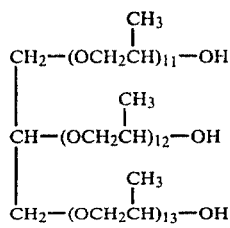

or a lactone extended glycerol having the formula:

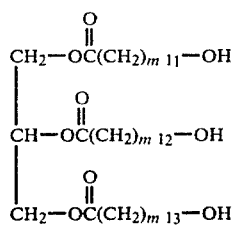

where m and $l_1$, $l_2$, and $l_3$ are as defined above. Typical propoxylated glycerines include DOW VORANOL 2025 brand propoxylated glycerine having a molecular weight of about 260 grams per gram mole, DOW VORANOL 2070 brand propoxylated glycerine having a molecular weight of about 700 grams per gram mole, and BASF-Wyandotte PLURACOL GP730 brand propoxylated glycerine having a molecular weight of about 730 grams per gram mole.

Other monomeric or polymeric materials may be introduced into the monomeric polyol (allyl carbonate) and polymerized therewith. These materials may impact higher viscosity to the polyol (allyl carbonate) while monomeric, thereby making processing easier. For example, olefinically unsaturated monomers, such as ethylene, propylene, isobutylene, methylpentene, butadiene, isoprene, vinyl acetate, acrylic acid, methacrylic acid, methyl acrylate, ethyl acrylate, methyl methacrylate, ethyl methacrylate, acrylonitrile, acrylamide, vinyl chloride, vinylidene chloride, vinyl pyrrolidene, vinyl pyridene, vinyl-methyl ether, vinyl ethyl ether styrene, divinyl benzene, and mixtures thereof. Alternatively, allyl monomers, such as allyl alcohol may be introduced into the monomeric polyol (allyl carbonate), or even monomers having allyl and vinyl functionality, as allyl methacrylate or allyl acrylate, may be introduced into the polyol (allyl carbonate).

Alternatively a polymeric material may be introduced into the polyol (allyl carbonate) monomer.

For certain applications, e.g., photographic lenses, photographic prisms, and the like, the polymer should be optically compatible with the polyol (allyl carbonate). That is, it should not form haze in the polyol (allyl carbonate) polymerizate.

Moreover, the polymer should be resistant to destruction by the peroxy initiators used to polymerize the polyol (allyl carbonate), and not interfere therewith.

As herein contemplated, the polymer may be a monofunctional homopolymer or a copolymer of monofunctional monomers, or a copolymer of a monofunctional monomer and a difunctional monomer. When the polymer is a polymer of a difunctional monomer, or a copolymer of a monofunctional monomer and a difunctional monomer, preferably the difunctional monomer has functional groups of high and low reactivity, e.g., a vinyl group and an allyl group, and the monofunctional monomer is a vinyl monomer.

Preferably the copolymer is a copolymer of (a) an acrylate, i.e., an acrylate ester or an acrylic acid, and (b) an ester of an acrylic acid and an allyl alcohol or substituted allyl alcohol having the formula:

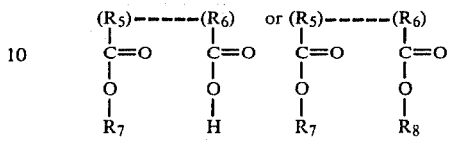

where

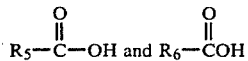

independently are acrylic acids, as acrylic acid, methacrylic acid, ethyl acrylic acid, butyl acrylic acid, propyl acrylic acid, and higher acrylic acids; and $R_4OH$ is an allyl alcohol or substituted allyl alcohol, having the formula:

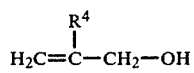

where $R^4$ is chosen from the group consisting of hydrogen, halogen, and $C_1$ to $C_4$ alkyls. Most frequently $R_7OH$ is allyl alcohol,

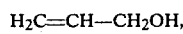

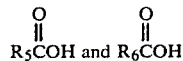

are independently either acrylic acid,

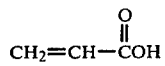

or methacrylic acid

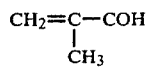

$R_8OH$ is a $C_1$ to $C_4$ alkyl alcohol, most commonly methanol or ethanol.

For example, the difunctional monomer may be allyl acrylate, allyl methacrylate, or the like, and the monofunctional monomer may be methyl acrylate, methyl methacrylate, ethyl acrylate, ethyl methacrylate, or the like. In this way there is provided a linear, minimally cross linked, soluble, swellable polymer, with polymerization predominantly through the vinyl groups.

Alternatively, the polymer may be a polymer of a monomer having mono-olefinic unsaturation, e.g., poly(styrene), poly(acrylonitrile), poly(vinyl chloride), poly(vinylidene chloride), poly(vinyl fluoride), poly(vinylidene fluoride), poly(vinyl acetate), poly(acrylic acid), poly(methacrylic acid), poly(methyl acrylate), poly(ethyl acrylate), poly(butyl acrylate), poly(methyl methacrylate), poly(ethyl methacrylate), poly(butyl methacrylate), poly(acrylamide), poly(ethylene), poly(propylene), and copolymers thereof. Alternatively, the polymer may be a heterochain polymer, i.e., a condensation polymer. Suitable heterochain polymers include saturated polyesters such as terephthalates, e.g., polyethylene terephthlate, and polycarbonates; polyethers, such as polyacetal, poly(ethylene oxide), poly(propylene oxide), poly(epichlorohydrin), poly(epichlorohydrin-ethylene oxide), poly(tetrahydrofuran); or polyamides and polyimides.

Where the end use of the polymerizate requires optical clarity, polymers that do not materially interfere therewith, i.e., polymers that do not form haze, are preferred. These polymers include poly(styrene), poly(acrylic acid), poly(methacrylic acid), poly(methyl acrylate), poly(ethyl acrylate), poly(butyl acrylate), poly(vinyl acetate), poly(allyl methacrylate-methyl methacrylate), poly(allyl acrylate-methyl acrylate), and poly(allyl acrylate-ethyl acrylate).

The polymer may be added directly to the polyol (allyl carbonate) monomer. Alternatively, the polymer may be added to an organic solvent, e.g., methylene chloride, whereby to form a solution. When the polymer is added to an organic solvent, the polyol (allyl carbonate) monomer is added to the solution, and the solvent driven off, e.g., by distillation, evaporation, boiling, or the like.

According to the exemplification where the polymer is first added to a solvent, and the polyol (allyl carbonate) is added to the resulting solvent. The especially preferred solvents are those solvents having a solubility parameter of about 9.0 to about 10.0 (calories/cubic centimeter)$^{-0.5}$, where the solubility parameter is the square root of the cohesive energy density, as described in F. Rodriquez, *Principles of Polymer Systems*, McGraw-Hill Book Co., New York, N.Y. (1970), and Beerbower, Kaye, and Pattison, *Chem. Engr.*, Dec. 18, 1967, page 118.

Exemplary solvents include halogenated hydrocarbons, such as methylene chloride, chloroform, dichloroethylene, ethylene dichloride, tetrachloroethane, tetrachloroethylene, trichloroethane, trichloroethylene, aromatics, such as benzene, nitrobenzene, orthodichlorobenzene, styrene, and chlorobenzene, and hydrocarbons. Alternatively, other solvents such as benzaldehyde, carbon disulfide, chlorobromomethane, cyclohexanone, ethyl chloroformate, diethylene glycol, diphenyl, turpentine, cyclohexane, isooctane, and the like may be used.

The amount of solvent is from about one to about twenty-five times the weight of polymer, and preferably from about four to about twenty times the weight of the polymers.

Additionally, colorants may be present in the monomer, whereby to provide a colorant in the thick casting.

The polymerization of the polyol (allyl carbonate) composition is initiated by the creation of active centers, e.g., free radicals. Useful free radical initiators are peroxy initiators. The peroxy initiators include: isobutyryl peroxide; di(2-ethylhexyl) peroxydicarbonate; acetyl cyclohexane sulfonyl peroxide; di(sec-butyl) peroxydicarbonate; diisopropyl peroxydicarbonate; 2,4-dichlorobenzoyl peroxide, t-butyl peroxypivalate; decanoyl peroxide; lauroyl peroxide, propionyl peroxide; 2,5-dimethyl-2,5-bis(2-ethyl hexylperoxy) hexane; acetyl peroxide; succinic acid peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide, 1-hydroxy-1'-hydroperoxy dicyclohexyl peroxide; t-butyl peroxyisopropyl carbonate; 2,5-dimethyl-2,5-bis(benzoylperoxy) hexane; t-butyl peroxyacetate; methyl ethyl ketone peroxides; di-t-butyl diperoxyphthalate and t-butyl peroxybenzoate.

Especially preferred peroxy initiators are those that do not discolor, char, or burn the resulting polymerizate. Exemplary are diisopropyl peroxydicarbonate and benzoyl peroxide.

The following examples are illustrative of the method of this invention.

EXAMPLE

A four inch (9.6 centimeter) thick casting of a copolymer of 90 weight diethylene glycol bis(allyl carbonate) and 10 weight percent methyl methacrylate was prepared by first partially curing thin sheets of the copolymer, and thereafter forming molds of two sheets of the partially cured copolymer, and a suitable gasket, providing a monomeric composition of diethylene glycol bis(allyl carbonate) and methyl methacrylate therein, and curing the sheets and the monomeric composition to form a monolithic, single phase, casting.

A liquid composition was prepared containing 90 weight percent diethylene glycol bis(allyl carbonate) and 10 weight percent methyl methacrylate. To this composition was added 0.1 weight percent diisopropyl peroxydicarbonate, basis total diethylene glycol bis(allyl carbonate) and methyl methacrylate. The composition was allowed to thicken at about 20 degrees Centigrade for sixteen hours. Thereafter sufficient diisopropyl peroxydicarbonate was added to the thickened composition to provide a composition containing 3 weight percent diisopropyl peroxydicarbonate, basis total diethylene glycol bis(allyl carbonate) and methyl methacrylate.

Six molds were prepared. Each mold was prepared by forming a circle of one half inch (12 millimeters) inside diameter, seven-eights inch (21 millimeters) outside diameter Tygon ® tubing on a glass plate, pouring the thickened composition onto the glass plate within the boundaries of the Tygon ® tubing, placing a second glass plate atop the Tygon ® tubing, and compressing the resulting assembly of glass plates, Tygon ® tubing, and monomer to a monomer and tubing thickness of one-half inch (12 millimeters) with a "C" clamp. The unused, thickened composition was stored in a stoppered bottle at 0° Centigrade.

The compressed assemblies were allowed to cure at 20° Centigrade for 11 hours. Thereafter the six compressed assemblies were put in an air circulation oven and cured according to the following cure cycle:

TABLE III

Time Temperature Sequence For Diisopropyl Peroxydicarbonate Cure

| Cumulative Time (hours) | Temperature, °C. |
|---|---|
| 0 | 42 |
| 4 | 44 |
| 6 | 45 |
| 8 | 47 |
| 10 | 48 |
| 12 | 50 |
| 14 | 52 |
| 16 | 54.5 |
| 18 | 57 |
| 20 | 61 |
| 22 | 69 |

The assemblies were removed from the oven, the molds were disassembled, and six rigid, transparent, partially cured sheets, one half inch (12 millimeters) thick were obtained. A multiple layer, sandwich assembly was then prepared of a glass plate with a one-eighth inch (3 millimeter) polyvinyl chloride gasket, a pool of partially cured, thickened composition within the gasket, the six sheets, with a one-eighth inch (3 millimeters) polyvinyl chloride gasket and a pool of partially cured, thickened composition between each pair of sheets, a one-eighth inch (3 millimeters) polyvinyl chloride with a pool of partially cured, thickened composition therein, and a glass sheet. The resulting sandwich assembly was clamped with a six inch (144 millimeter) "C" clamp. The assembly was placed in an air circulation oven and cured according to the following time-temperature sequence:

TABLE IV

| Time Temperature Sequence For Diisopropyl Peroxydicarbonate Cure | |
|---|---|
| Cumulative Time (hours) | Temperature, °C. |
| 0 | 45 |
| 4 | 45 |
| 6 | 45 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 23.6 | 80 |
| 24 | 80 |
| 24.1 | 100 |

The sandwich assembly was then removed from the oven, and allowed to cool. The "C" clamp and gaskets were removed. The resulting 4 inch (96 millimeter) monolithic gasket was uniform in appearance.

Although this invention has been described in terms of specific details and embodiments, the description is not intended to limit the invention, the scope of which is defined in the following claims.

I claim:

1. A method of forming a thick casting of polyol (allyl carbonate) comprising:
   (a) forming a monolithic rigid sheet comprising partially cured polymeric polyol (allyl carbonate);
   (b) forming a pool of polyol (allyl carbonate) monomer in contact with the monolithic rigid sheet of partially cured polymer; and
   (c) thereafter curing the monolithic rigid sheet of partially cured (monolithic polymerizate) polymer and the monomer in contact therewith whereby to form a single phase (second polymerizate) casting thicker than the monolithic rigid sheet.

2. The method of claim 1 comprising first curing said monomer to form the monolithic rigid sheet of partially cured polymer having a fifteen second Barcol hardness of less than 20, and thereafter curing the partially cured monolithic rigid sheet of partially cured polymer and the monomer in contact therewith whereby to form a single phase casting having a fifteen second Barcol hardness greater than 28.

3. The method of claim 1 wherein the single phase second casting has a substantially uniform index of refraction.

4. The method of claim 1 wherein the polyol (allyl carbonate) is a diol bis(allyl carbonate) having the formula

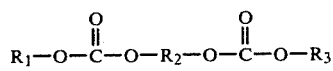

where $R_1$ and $R_3$ are chosen from the group consisting of allyl groups independently represented by the formula

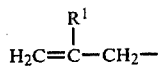

where $R^1$ is chosen from the group consisting of hydrogen, halogen and $C_1$ to $C_4$ alkyls, and $R_3$ is chosen from the group consisting of alkylene groups, alkylene ether groups, alkylene polyether groups, alkylene carbonate groups, and alkylene polyether groups.

5. The method of claim 4 wherein the diol bis(allyl carbonate) is diethylene glycol bis(allyl carbonate).

6. A method of forming a thick casting of polyol bis(allyl carbonate) comprising:
   (a) forming a monolithic rigid sheet having a fifteen second Barcol hardness of less than 20 and comprising partially cured polymeric polyol bis(allyl carbonate);
   (b) forming a pool of polyol (allyl carbonate) monomer in contact with the monolithic rigid sheet of partially cured polymer; and
   (c) thereafter curing the monolithic rigid sheet of partially cured polyol(allyl carbonate) and the polyol(allyl carbonate) monomer in contact therewith whereby to form a single phase casting having a fifteen second Barcol hardness greater than 28.

7. The method of claim 6 wherein the polyol (allyl carbonate) is diethylene glycol bis(allyl carbonate).

* * * * *